United States Patent [19]

Brunnett et al.

[11] Patent Number: 4,870,667
[45] Date of Patent: Sep. 26, 1989

[54] RADIATION DETECTOR

[75] Inventors: Carl J. Brunnett, Willoughby Hills; Rodney A. Mattson, Mentor, both of Ohio

[73] Assignee: Picker International, Inc., Cleveland, Ohio

[21] Appl. No.: 302,097

[22] Filed: Jan. 24, 1989

Related U.S. Application Data

[63] Continuation of Ser. No. 36,166, Apr. 7, 1987, abandoned, which is a continuation of Ser. No. 770,429, Aug. 29, 1985, abandoned.

[51] Int. Cl.[4] .............................................. G01N 23/00
[52] U.S. Cl. ................................... 378/19; 250/367; 378/5
[58] Field of Search ..................... 378/19, 5; 250/367

[56] References Cited

U.S. PATENT DOCUMENTS

| | | | |
|---|---|---|---|
| 3,965,358 | 6/1976 | Macovski | 370/19 |
| 4,070,581 | 1/1978 | Gibbons et al. | 378/19 |
| 4,127,932 | 12/1978 | Hartman et al. | 357/13 |
| 4,247,774 | 1/1981 | Brooks | 378/19 |
| 4,292,538 | 9/1981 | Carlson | 250/367 |
| 4,323,784 | 4/1982 | Conrad | 370/5 |
| 4,365,341 | 12/1982 | Lam | 378/65 |
| 4,511,799 | 4/1985 | Bjorkholm | |
| 4,535,245 | 8/1985 | Zonneveld et al. | |

FOREIGN PATENT DOCUMENTS

WO81/00457 8/1980 PCT Int'l Appl. .

OTHER PUBLICATIONS

Kurfess et al., "NaI(Tl)–CsI(Na) Phoswitch Detectors for X-Ray Astronomy", *IEEE Trans. NuSci,* vol. NS-22, pp. 626–632, Feb. 1975.

Alvarez et al., "Energy-Selective Reconstruction in X-Ray Computerized Tomography", *Phys. Med. Biol.*, 1976, vol. 21, pp. 733–744, 1976.

Patents Abstracts of Japan, vol. 9, No. 68 (P-344)[1791], 28th Mar. 1985; & JP-A-59 200 983 (Toshiba K.K.) 14-11-1984.

*Primary Examiner*—Craig E. Church
*Attorney, Agent, or Firm*—Watts, Hoffmann, Fisher & Heinke Co.

[57] ABSTRACT

An improved computed tomography radiation detector is disclosed. One embodiment includes first and second layers of crystalline scintilation material mutually aligned in a path of x-rays to be detected, to receive the x-rays in sequence. The layer upstream in the x-ray path comprises a scintillation material having a relatively high efficiency for converting x-ray energy to light. The downstream one of the layers comprises a scintillation material having a relatively lower efficiency for x-ray/light conversion. A photodiode is positioned to view both scintillation layers simultaneously and to respond to scintillations in either or both. Scintillation crystal material surfaces can be coated with reflective material to enhance the effects of their scintillations. The photodiode thus combines x-ray indicating scintillations from both crystals while in analog form. The detector exhibits enhanced response to lower energy x-rays. Another embodiment comprises a photodiode and an optically coupled scintillation crystal, with the photodiode upstream in the x-ray beam path relative to the crystal.

25 Claims, 3 Drawing Sheets

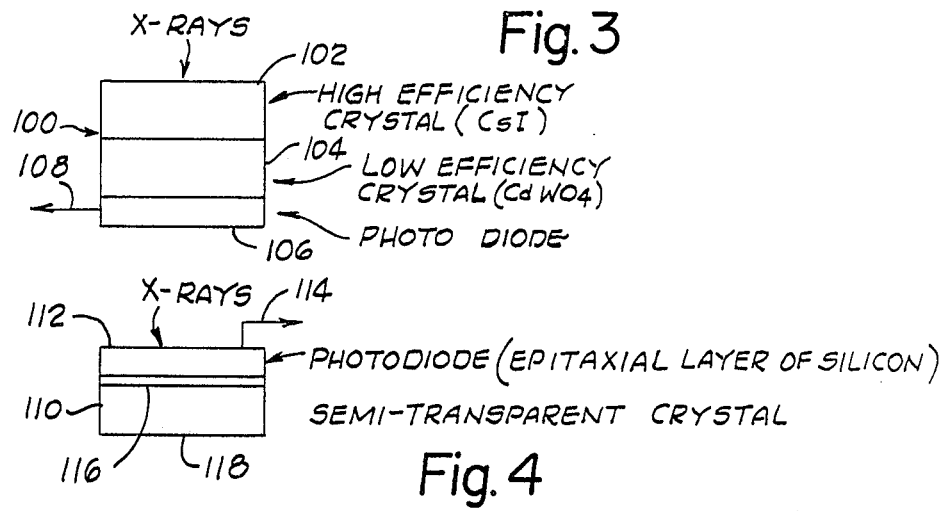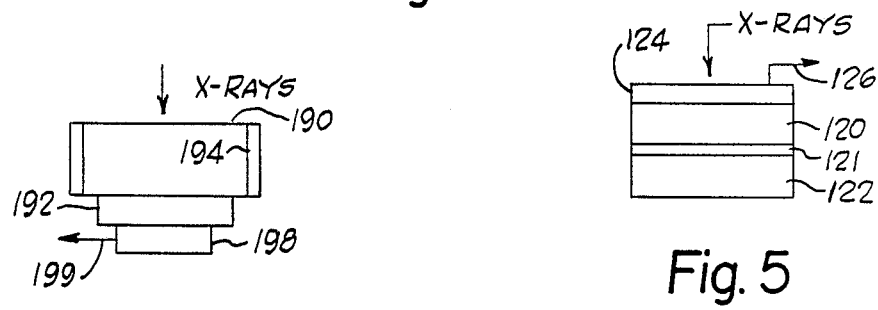

RADIATION DETECTOR

This application is a continuation of application Ser. No. 036,166, filed Apr. 7, 1987 which is a continuation of application Ser. No. 770,429, filed 8/29/85.

TECHNICAL FIELD

The present invention relates to method and apparatus for enhancing diagnostic medical images is particularly adapted to improving radiation detection in computed tomography.

BACKGROUND ART

In both emission and transmission computed tomography, information concerning the internal structure of a subject of interest is obtained without invasive procedures.

In computed tomography a two dimensional image is generated from multiple one dimensional projections. A source of x-radiation transmits X-rays through a subject of interest and the intensitiy of that radiation is monitored on an opposite side by one or more detectors, which are often single scintillation crystals each optically coupled to a differnt photodiode. If the source is moved about the patient and X-ray attenuation data is obtained from a number of directions, a computed tomography reconstruction process can be utilized to generate an image of the subject cross-section.

The x-ray tube radiation source used in computed tomography emits x-ray photons over polychromatic or continuous energy spectrum which extends from near zero in energy to a maximum which is determined by the voltage (kv) applied to the source. The performance and energy spectra of x-ray tubes is well understood and documented by those of ordinary skill in the relevant art.

The radiation detectors utilized in computed tomography each produce a signal proportional to the total x-ray energy absorbed by the detector. The lower energy x-ray photons striking a detector contribute a relatively small amount to the total output signal of the detector, whereas the higher energy photons incident on the detector produce correspondingly larger contributions to the output signal.

The low energy x-ray photons are more readily absorbed in the patient, while the high energy photons have a greater tendency to pass through the patient's body and to undergo less attenuation than do the low energy x-ray photons. Hence, the low energy radiation contains more contrast information defining the patient's internal body structure than does the high energy radiation, which more uniformly passes through the patient's body, as a result of less attenuation.

Therefore, the detector output signal is more a function of the high energy radiation, which carries relatively less contrast information, than it is a function of the lower energy radiation which is relatively rich in image information. Accordingly, the present detectors that employ a single energy sensitive element (e.g., a single scintillation crystal or a gas filled ion chamber) weights its output signal in favor of the less informative high energy radiation than in favor of the more informative low energy radiation.

The generation of x-ray photons by an x-ray tube anode is a random process. Even where the x-ray tube kV and mA (voltage and current) are held constant, the number of photons emitted from the anode fluctuates statistically in time about an average value with a Poisson probability distribution. The absorption, or attenuation, of the x-ray photons in matter, such as in a patient's body, is also a random process following similar laws of probability theory. Therefore, the number of photons detected during a fixed time period, with all other conditions held constant, will vary from one measurement to the next. This statistical fluctuation in the measurement gives rise to an uncertainty or ambiguity in the true value of the attenuation. This ambiguity is sometimes referred to as "quantum noise" or "quantum statistics". While this quantum noise sets an absolute, or fundamental limit on the quality of an image that can ultimately be obtained, unequal response by the detector to photons of different energies magnifies this noise problem.

Noise in the detector output signal which results from the quantum statistics associated with the detection of N x-ray photons is given by the following relation:

$$\sigma = \sqrt{\frac{\sum_{n=1}^{N}(W_n)^2}{\sum_{n=1}^{N}(W_n)}}$$

where:

$\sigma$ = the standard deviation (or RMS noise) of the output signal, expressed as a fraction of the signal (i.e., noise to signal ratio);

$W_n$ = Weight (or signal contribution) of the $n^{th}$ photon, and

N = Total number of photons detected.

In most present detection systems used in computed tomography, W is proportional to the absorbed energy of the photon. However, less noise (or $\sigma$) is obtained if $W_n$ is constant (i.e., every photon is weighted equally). In this optimum case, the standard deviation is given by the familiar formula:

$$\sigma = \frac{1}{\sqrt{N}}$$

To illustrate with an example, consider two cases:

Case I. (Unequal Weighting)

Let N=100 and assume that half of the detected photons have a relative weighting of W, and the other half are higher in energy and have a relative weighting of 4W, then $$\sigma = \frac{\sqrt{\sum_{n=1}^{N/2} W^2 + \sum_{n=1}^{N/2}(4W)^2}}{\sum_{n=1}^{N/2} W + \sum_{n=1}^{N/2}(4W)} =$$

$$\frac{\sqrt{50W^2 + 800W^2}}{50W + 200W} = .117$$

Case II. (Equal Weighting)

Let N=100 and assume that all photons are detected with relative weighting of W; then $$\sigma = \frac{\sqrt{\sum_{n=1}^{N} W^2}}{\sum_{n=1}^{N} W} = \frac{\sqrt{100\, W^2}}{100\, W} = 0.100$$

As can be seen in this set of examples, Case I is 17% noisier than Case II. In order for Case I to achieve the reduced level of noise of Case II, the number of detected photons, i.e., N, would have to be increased to 136. This would correspond to an increase in patient dose of 36%.

Thus, the characteristic of present detectors to weight their response to high energy photons more heavily than to low energy photons results in an exaggerated effect of noise in the output signal, and, in order to compensate for this noise, requires a larger x-ray dose to be applied to the subject.

It is an objective of this invention to provide a detector of penetrative radiation having reduced noise caused by the quantum statistics of the polyenergetic spectrum of the x-ray tube output and which exhibits enhanced response to the more informative lower energy portion of the detected x-ray energy spectrum.

DISCLOSURE OF INVENTION

The disadvantages of the prior art as described above are reduced or eliminated by the provision of an improved detector for responding to penetrative radiation propagated along a path. The detector includes a first scintillator interposed in the path, and a second scintillator, also interposed in the path downstream of the first scintillator. The second scintillator substantially abuts the first scintillator to form an at least partially optically transmissive interface. A light detecting element is optically coupled to the scintillators in such a manner as to respond to both scintillations occurring in the first scintillator and scintillations occurring in the second scintillator.

The detector as described thus provides a means wherein the light detector sense scintillations occurring in both crystals, and which combines these scintillations into a single output signal.

This single output signal is susceptible of weighting to emphasize the low energy response of the detector.

Weighting of the detector response to emphasize the low energy response of the detector can be achieved in many ways. To illustrate, a specific embodiment of the invention will be considered. In such an embodiment, the first, or upstream, scintillator comprises scintillation material having a relatively high quantum efficiency for converting x-ray energy to light, and thus is relatively highly sensitive to low energy x-ray photons which are preferentialy absorbed in the upstream scintillator. The second scintillator comprises scintillation material having a relatively lower quantum efficiency for converting x-ray energy to light, and, because of its relative downstream location, responds preferentially to higher energy x-ray. Because of its lower conversion efficiency, the higher energy x-rays absorbed in the second scintillator have a relatively reduced contribution to the single analog output signal of the light detector element.

In another embodiment, the detector comprises a photodiode and one or more optically coupled scintillators, with the photodiode positioned relatively upstream in the x-ray beam path with respect to the scintillators. In this embodiment, lower energy radiation is absorbed nearer the photodiode than is higher energy radiation, and thus the contribution of the lower energy x-ray photons to the photodiode output is relatively enhanced.

In this embodiment, when two scintillators are used, this effect of enhancing lower energy response can be heightened by provision of a partially optically transmissive coating layer between the scintillators.

A further specific feature is the inclusion of reflective coating material on scintillator surfaces, for enhancing the response contribution of the scintillator to which the reflective material is applied.

In another embodiment, an ionization detector is employed having two sets of differentially sized charge collection plates arranged sequentially in the x-ray beam. The upstream set of collection plates are located in the region of the ionization chamber in which the lower energy x-rays are preferentially absorbed. The downstream set of plates respond preferentially to the higher x-ray energy.

Where this embodiment is employed, each set of plates develops a separate charge output which is combined with the output of the other in such a way to form a single output having enhanced lower energy response. The enhancement of the lower energy response, in a more specific embodiment, is increased by the use of differing amplification and/or attenuation of the output signals from the respective sets of collection plates. The degree of lower energy response can also be enhanced by making the upstream plates larger than the downstream plates.

These and other aspects and features of the present invention will be understood in more detail by reference to the following detailed description, and to the drawings, in which:

BEST MODE FOR CARRYING OUT THE INVENTION

Figure 1:
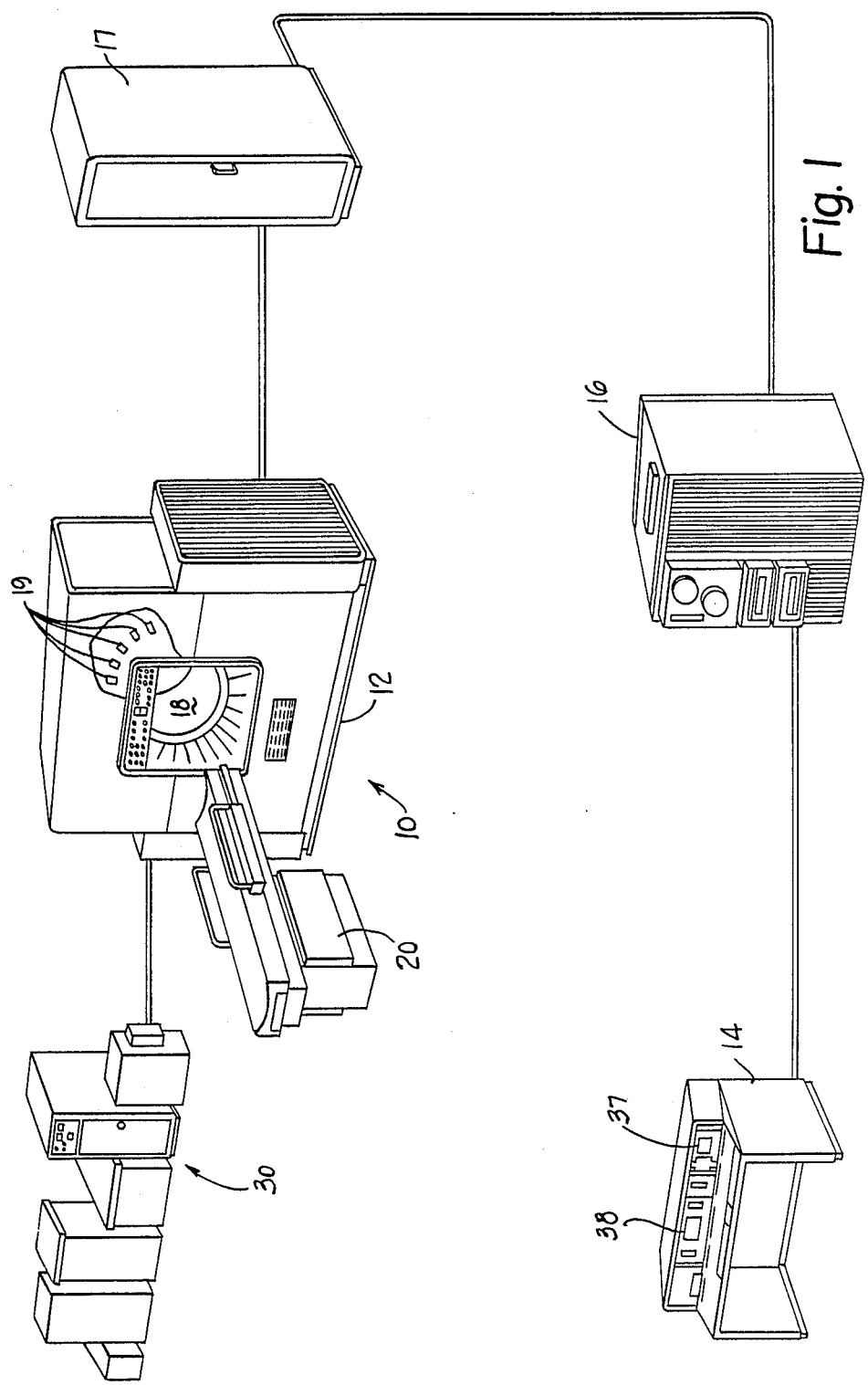
FIG. 1 is a perspective view, partially broken away, illustrating a system incorporating the present invention.

Turning now to the drawings, FIG. 1 illustrates a computed tomography scanning system 10 used in imaging cross-sectional slices of interest in a patient. The computed tomography system 10 comprises a scanner 12, a viewing console 14, a computer system 16, and specialized electronics 17 needed by the scanner 12 for control and data handling.

While the invention can be employed in any CT geometry, the scanner as shown for example at 12 comprises a fourth generation computed tomography scanner having a movable x-ray source (not shown) and a fixed array of detectors such as 19 surrounding a patient aperture 18. During imaging, a patient is positioned on a couch 20 and then moved into and through the patient aperture 18 until a cross-sectional slice to be imaged is appropriately positioned. A series of electronic subsystems 30 shown to the side of the computed tomography scanner 12 provide power suitable for creating x-radiation.

In computed tomography scanning, the special electronics 17 analyzes intensity values detected by the scanner 12. This specialized electronics 17 measures the output from the scanner detectors as well as controls movement of an X-ray tube source and coordinates this movement with the analysis of the output signals.

High speed computed tomography imaging is possible through use of a high speed data processing computer system 16. The computer system 16 performs the data processing for reconstructing an image of attenuation variations inside the patient slice from intensity readings taken from a plurality of detectors surrounding the patient aperture. The cmputer system is responsible for analyzing and reconstructing cross-sectional image densities and for displaying this information on the console 14. The console depicted in FIG. 1 includes a first CRT 37 for a technician operating the computed tomography apparatus and a second CRT 38 for a person responsible for diagnosing from the images produced.

The system employs new and improved detector structure. Each preferred detector comprises at least one scintillation crystal coupled to at least one photodiode, as explained in more detail below. In operation, when x-radiation impinges upon a scintillation crystal, it is converted to visible light which in turn causes current flow in a photodiode. The analog current produced by the x-radiation is converted to a digital signal by an analog to digital converter 51. Electronics for generating these digital signals are known in the art.

Figure 2:
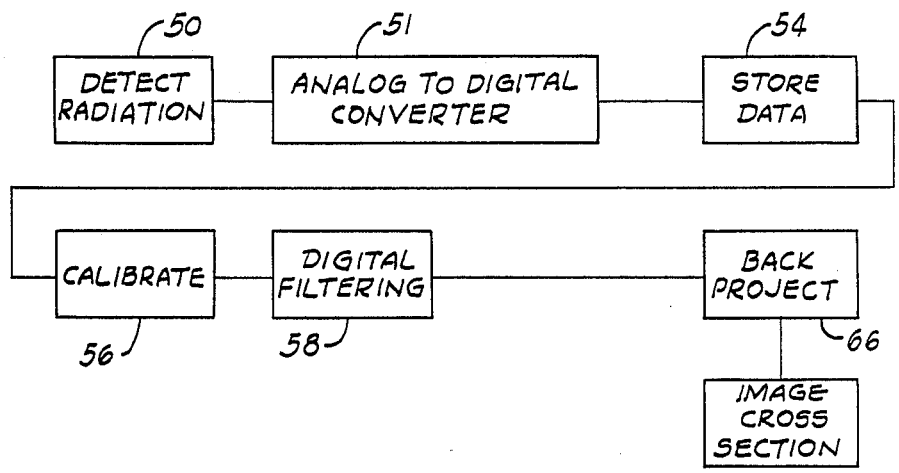
FIG. 2 is a flow diagram illustrating functions of operation of the system of FIG. 1, and FIGS. 3-6 are drawings of respective embodiments of the present invention.

The steps (See FIG. 2) of detecting the radiation 50 and generating the digital output 51 of the converter are depicted in a flow chart schematically describing the computed tomography process. The two steps 50, 51 are followed by taking the logarithm of the data and a storing 54 of that data in the computer system. The logarithm of the intensity data yields attenuation information.

The remaining steps in the computed tomography process are performed by the computer system 16. The computer system first performs a series of calibration calculations 56 on the data. These calculations are based upon data obtained during a CT set-up phase. These calculations take into account variations in detector sensitivity, gain, and offsets in the electronics. Once these calibration steps have been completed, a digital filtering step 58 is performed where all data from each detector is filtered in accordance with a filter function. The process consists of performing a forward fast fourier transform (FFT) of the data, multiplying the transformed data by a frequency filter, and then performing an inverse FFT to produce the filtered data.

Finally, the data are back projected at 66 into a memory to produce an image of a particular patient slice under examination. Once this back projection process has been completed, the image can be viewed at the console 14 (FIG. 1).

An important purpose of this invention is the provision of improved embodiments for the detectors, having enhanced response to lower energy radiation and which reduce the noise resulting from the statistical variations of the radiation photons.

An important feature of the invention involves increasing the weighting, or detector output signal contribution of the lower energy x-ray photons relative to the weighting or signal contribution of the higher energy photons. Such a radiation detector will produce an output signal which is lower in noise and higher in information content than could be produced by prior art detectors.

One embodiment of such an improved detector comprises a scintillator including a sandwich of two or more layers of scintillation material having different energy conversion efficiency characteristics. Referring to FIG. 3, the geometry of such a detector 100 is such that radiation from the source first impinges upon a first layer 102 of scintillation material, such as cesium iodide, of thickness 0.2 mm, having a relatively high efficiency in converting x-ray photons to light photons. In the layer 102, the lower energy x-ray photons tend to be preferentially absorbed, while the higher energy photons tend to pass through the layer 102 and to be absorbed in a layer 104 which comprises a scintillation material, such as cadmium tungstate, of thickness 2.0 mm, having a relatively lower efficiency in converting x-ray photons to light photons. The interface between the layers 102, 104 is at least partially light transmissive.

The light scintillations from both the layers 102, 104 are detected by a photodiode 106, which views both layers simultaneously, and produces an analog electrical output signal on a lead 108 which is a function of the detected analog scintillations from both layers.

The net effect of this phenomenon is that the component of the analog output signal, appearing at the lead 108, which is due to the lower energy photons, has enhanced weighting relative to the contribution attributable to the higher energy x-ray photons striking the detector. That is, the signal at the lead 108 has a relatively enhanced component which comprises a contribution resultant upon the conversion to light energy of the lower energy x-ray photons, compared to the results obtained in prior art detectors having only a single crystal upstream of the photodiode in the x-ray path.

Additionally, the enhancement of the response of the output 108 due to lower energy x-ray photons renders the signal appearing at the output 108 more independent of random photon fluctuations of the incident x-ray energy than would be the case if only the lower efficiency crystal 104 were used. This is because the high and low energy components of the analog output signal at 108 are more nearly equal, for a polyenergetic spectrum, when the weighting of the lower energy contribution is enhanced.

FIG. 4 shows a different embodiment of the invention for achieving enhanced weighting of the detector response to the lower energy x-ray photons. This embodiment includes a single relatively thick scintillator layer 110 and a single photodiode 112. In the FIG. 4 embodiment, the photodiode is positioned upstream in the x-ray path with respect to the crystal 110. Thus, x-rays transmitted through the subject first pass through the relatively thin photodiode 112, and are then absorbed in the crystal 110.

The lower energy x-ray photons are preferentially absorbed, and converted to light photons, in the region of the layer 110 near its upstream surface 116. The higher energy x-ray photons are converted to light photons generally more near the lower, or downstream, surface 118 of the layer 110.

Thus, the light photons resulting from the lower energy x-ray photons are preferentially converted to light scintillations nearer the photodiode 112 than are the scintillations resulting from the higher energy x-ray photons. This is true because the higher energy photons tend to penetrate further through the layer 110, before being converted to light scintillations, than do the lower energy x-ray photons. Therefore, the photodiode 112 will respond more strongly to the scintillations near the surface 116 than to those near the surface 118, due to the fact that the scintillations near the surface 116 are closer to the photodiode than those further away near the surface 118.

In the FIG. 4 embodiment, the photodiode 112 comprises an epitaxially grown layer of silicon. The scintillation layer 110 comprises a portion of semi-transparent crystal, for example cadmium tungstate, and has a thickness of about 2 mm. The semi-transparency of the layer 110 helps to exaggerate the attenuation of the response of the photodiode 112 to more distant scintillations occurring near the surface 118, to assist in further enhancing the weighting of the low energy response in the output signal at the lead 114.

In accordance with another embodiment, as shown in FIG. 5, a detector incorporates a sandwich crystalline layer assembly 120, 122, in combintion with a photodiode 124. As in the FIG. 4 embodiment, the photodiode 124 is positioned relatively upstream in the x-ray path, and receives incident x-rays prior to the crystalline layers. The incident x-rays first penetrate the photodiode 124, which is substantially transparent to x-ray, and are absorbed in the layers 120, 122. In the FIG. 5 embodiment, the layer 120 comprises a high efficiency absorber, such as cesium iodide, of thickness 0.2 mm, which preferentially absorbs and converts to light lower energy x-ray photons. The layer 122 comprises a material having lower efficiency for converting x-ray photons to light photons, such as cadmium tungstate, with a thickness of 2 mm. As in the case of the embodiments of FIGS. 3 and 4, the photodiode 124 produces an output signal 126 having an enhanced response to lower energy photons, and which combines lower and higher energy representing signals in analog form.

In order to maintain the statistical noise at a minimum, it is important that only a very small fraction of the x-ray photons be absorbed in the diffusion layer of the silicon in the photodiode. A photodiode of epitaxially grown silicon, as described above, satisfies this criterion.

In the embodiments described above, additional measures can be taken to further influence the respective weighting of response to higher and lower energy x-rays.

For example, different scintillation phosphors can be chosen based on their respective preferential absorption of lower and higher x-ray energy. Choices of such phosphor materials for their preferential absorption characteristics are generally described in published European Patent Application No. 0115125, published on Aug. 8, 1984, by Gary L. Barnes, which is expressly incorporated by reference. Suitable low efficiency crystal materials include bismuth germanate, and higher efficiency materials include cadmium tungstate.

Preferably, scintillator materials are chosen which fluoresce in the green to red portion of the spectrum, to which photodiodes tend to be more responsive than to other colors. The scintillators preferably have k-absorption edges below about 40 kev.

In the FIG. 3 embodiment, the crystal 102 has a higher photon to light conversion efficiency than does the crystal 104. The crystal 104, however, is more radioabsorptive than the crystal 102.

Generally, the crystal 102 can have a thickness of about 0.1 mm to about 0.4 mm, and the crystal 104 can have a thickness of about 2 mm.

Alternately, the detector components can comprise solid state detectors, wherein the component corresponding to the crystal 102 can comprise silicon, and the component corresponding to crystal 104 can comprise mercuric iodide.

FIG. 6 illustrates other aspects of the embodiments, such as that of FIG. 3, which can be employed to alter or enhance the relative weighting of the x-ray energy components of a detector output signal. The embodiment of FIG. 6 includes crystalline layers 190, 192, and a photodiode 198 having an output 199.

For example, as shown in FIG. 6, increasing the thickness of the layer 190 with respect to the layer 192 further alters the response of the layer 190 to x-rays and therefore enhances the response of the photodiode 198 to scintillations occurring in the layer 190.

Furthermore, the relative response of the photodiode 198 to scintillations in the layers 190, 192, respectively, can be altered by choosing the crystals 190, 192 to have differing geometry and/or area size, as also shown in FIG. 6.

The response of the photodiode 198 to scintillations occurring in a given layer, such as 190, can also be enhanced by providing a layer or coating 194 of reflective material about some or all of the outer surface of the scintillator. Selection of the type of reflective material and means of application to create such reflective surfaces is within the ordinary skill in the art.

All the foregoing aspects of the embodiment of FIG. 6 can be employed in order to desirably tailor the response of the photodiode 198 to scintillations within the respective layers 190, 192, in order to enhance the weighting of the response to low energy x-ray photons in the output signal 199 from the photodiode 198.

Referring also to the embodiment of FIG. 5, it is seen that a layer 121 which is only partially transmissive of visible light can further enhance the weighting of the response of the photodiode 124 to scintillations occurring in the layer 120, by inhibiting the response of the photodiode to scintillations occurring in the crystal 122.

It is to be understood that the embodiments of the present invention described herein are intended as illustrative, rather than exhaustive, of the invention. It is to be realized that persons of ordinary skill in the relevant art may make certain additions or modifications to, or deletions from, the embodiments described herein, without departing from the spirit or scope of this invention, as set forth in the appended claims.

I claim:

1. In a medical diagnostic system for imaging penetrative radiation, and having a source means for propagating penetrative radiation along a path, the improvement comprising:

(a) a detector assembly spaced from the source means and located in the radiation path, said detector assembly comprising:

(i) first and second crystalline scintillator detector components each responsive to penetrative radiation to produce first and second analog light responses, respectively, to incident radiation, said first and second scintillator detector components being aligned in and arranged serially along said radiation path, said scintillator components respectively presenting approximately equal cross sectional area in said path, for presenting equal cross sectional areas to the radiation beam, said first detector scintillator component being positioned nearer said source means than said second detector scintillator component, said first detector component having a higher photon to light conversion efficiency than said second detector component, said first detector component being optically coupled to said second detector component, and (ii) light sensitive means, optically coupled to said second detector component and sensitive to both said first and second light responses, for viewing said scintillators simultaneously and combining in analog form said first and second analog responses into a single analog output, and (b) means responsive to said analog output for producing representation of contribution to images produced in response to penetrative radiation detected by said first and second scintillator components.

2. The system of claim 1, wherein:
said first and second scintillator detector components comprise mutually dissimilar scintillation material.

3. The system of claim 1, wherein:
said first and second scintillator detector components and said light sensitive means are arranged in a stacked closely spaced configuration.

4. The system of claim 1, wherein:
said light sensitive means comprises a photodiode.

5. The system of claim 4, wherein said photodiode comprises epitaxially grown silicon.

6. The system of claim 1, wherein:
said scintillator detector components each have absorption edges below about 40 kev.

7. The system of claim 1, wherein:
said detector scintillator components each comprise material which fluoresces in the green to red spectral portion.

8. The system of claim 1, wherein:
(a) said first scintillator comprises cesium iodide;
(b) said second scintillator comprises cadmium tungstate.

9. The system of claim 1, wherein:
(a) said first scintillator has a thickness of about 0.1 millimeters to 0.4 millimeters, and
(b) said second scintillator has a thickness of about 2 millimeters.

10. The system of claim 1, wherein:
(a) said first detector scintillator comprises cadmium tungstate, and
(b) said second detector scintillator comprises bismuth germanate.

11. In a compound tomography medical diagnostic imaging system having an x-ray source means, movable relative to a subject for propagating x-rays through the subject, the improvement comprising:
(a) a detector assembly for monitoring radiation propagated through the subject by the source means, said detector assembly comprising:
(i) a first scintillator for receiving said radiation;
(ii) a second scintillator aligned with and optically coupled to said first scintillator with respect to a path of said radiation propagated through the subject such that radiation passes sequentially through the first and second scintillators in that order, said first and second scintillators each presenting an approximately equal cross sectional area to said radiation beam;
(iii) a light detecting element located for viewing said scintillators simultaneously, said light detecting element being optically coupled to said second scintillator and responsive to sensed light to produce an analog electrical output signal, and (b) image reconstruction means coupled to receive said output signal for producing a contribution to at least a portion of a representation of reconstructed images of said x-rays.

12. A detector responsive to radiation propagated along a path for use in diagnostic imaging, said detector comprising:
(a) a first scintillator in said path having a first photon to light conversion efficiency;
(b) a second scintillator in said path downstream with respect to said first scintillator and aligned with and optically coupled to said first scintillator, said second scintillator having a photon to light conversion efficiency which is less than that of said first scintillator, each of said first and second scintillators presenting a surface of approximately equal cross sectional area to said radiation, and
(c) a light detecting element optically coupled to said second scintillator and positioned to respond to scintillations occurring in either of said first and second scintillators said element producing analog signals representing the analog sum of scintillations occurring in said first and second scintillators.

13. The detector of claim 12, wherein said first scintillator comprises cesium iodide and said second scintillator comprises cadmium tungstate.

14. The detector of claim 12, wherein said first scintillator comprises cadmium tungstate and said second scintillator comprises bismuth germanate.

15. The detector of claim 12, wherein:
(a) said first scintillator has a thickness of about 0.1 mm to 0.4 mm; and
(b) said second scintillator has a thickness of about 2 mm.

16. The detector of claim 12, wherein said first and second scintillators each define different geometries.

17. The detector of claim 12 wherein a layer of reflective material is applied to a portion of the outer surface of at least one of said scintillators for altering the reflective properties of the surface of said at least one scintillator.

18. In a medical diagnostic imaging system;
(a) a radiation source means for producing a beam of penetrative radiation having different energy components;
(b) a detector assembly spaced from said source means in the beam path for receiving radiation from said source, said detector assembly comprising:
(i) a first material preferentially responsive to lower energy radiation for converting said lower energy radiation to a first light signal;
(ii) a second material preferentially responsive to higher energy radiation passing through said first material for converting said higher energy radiation to a second light signal, said second material being optically coupled to said first material; and,
(iii) light detection means, optically coupled to said second material and simultaneously responsive to said first and second light signals, for producing an analog electrical signal representative of the sum of said first and second light signals, said first and second materials defining respectively aligned and substantially equal cross sectional areas presented to the radiation beam for interception of incident radiation and (c) means for producing a portion of an image in response to said analog electrical signal.

19. The medical diagnostic imaging system of claim 18, wherein said first and second materials each comprise a portion of crystalline scintillation material.

20. The medical diagnostic imaging system of claim 19, wherein said crystalline scintillation portions comprise mutually dissimilar scintillation materials.

21. The medical diagnostic imaging systems of claim 20 wherein:
(a) one of said materials comprises cesium iodide, and
(b) the other of said materials comprises cadmium tungstate.

22. The medical diagnostic imaging system of claim 19, wherein said portions of crystalline material each comprise differing geometries.

23. The medical diagnostic imaging system of claim 18, wherein said light detection means comprises a photodiode.

24. The system of claim 23, wherein said photodiode comprises epitaxially grown silicon.

25. A method of detecting penetrative radiation for use in medical diagnostic imaging, said method comprising the steps of:
(a) propagating a beam of penetrative radiation along a path and through a subject to be imaged;
(b) converting penetrative radiation which has passed through the subject to light with a first conversion efficiency by the use of a first scintillator;
(c) subsequently converting to light radiation which has passed through said first scintillator by the use of a second scintillator with a second conversion efficiency lower than said first conversion efficiency, said conversion steps being performed on radiation passing through substantially equal cross sectional area presented to said beam path;
(d) simultaneously viewing light produced by said first and second scintillators by the use of a light detecting element for producing an analog signal representing the summed analog responses of said first and second scintillator.

* * * * *

UNITED STATES PATENT AND TRADEMARK OFFICE
CERTIFICATE OF CORRECTION

PATENT NO. : 4,870,667

DATED : September 26, 1989

INVENTOR(S) : Carl J. Brunnett, et al.,

It is certified that error appears in the above-identified patent and that said Letters Patent is hereby corrected as shown below:

Column 2, lines 22-29: contract the square root sign to encompass only the numerator of the fraction in the equation and add an upper case sigma in the numerator, as shown here:

$$\sigma = \frac{\sqrt{\sum_{n=1}^{N} (W_n)^2}}{\sum_{n=1}^{N} (W_n)}$$

Column 2, lines 55-62, add two upper case sigmas to the numerator of the fraction in the equation, as shown here:

$$\sigma = \frac{\sqrt{\sum_{n=1}^{N/2} W^2 + \sum_{n=1}^{N/2} (4W)^2}}{\sum_{n=1}^{N/2} W + \sum_{n=1}^{N/2} (4W)}$$

UNITED STATES PATENT AND TRADEMARK OFFICE
CERTIFICATE OF CORRECTION

PATENT NO. : 4,870,667

DATED : September 26, 1989

INVENTOR(S) : Carl J. Brunnett, et al.,

It is certified that error appears in the above-identified patent and that said Letters Patent is hereby corrected as shown below:

Column 3, lines 1-6, add a square root sign encompassing the numerator of the fraction of the equation as shown here:

$$\sigma = \frac{\sqrt{\sum_{n=1}^{N} w^2}}{\sum_{n=1}^{N} w} = \frac{\sqrt{100 \, w^2}}{100 \, w} = 0.100$$

Signed and Sealed this

Eleventh Day of September, 1990

Attest:

HARRY F. MANBECK, JR.

*Attesting Officer*     *Commissioner of Patents and Trademarks*